United States Patent [19]
Ando et al.

[11] Patent Number: 5,334,114
[45] Date of Patent: Aug. 2, 1994

[54] CONTROL SYSTEM FOR SERVO HYDRAULIC PRESSURE IN VEHICULAR AUTOMATIC TRANSMISSION

[75] Inventors: Masahiko Ando, Okazaki; Koji Noda, Anjo; Yoshihisa Yamamoto, Nishio; Masahiro Hayabuchi, Anjo; Kazumasa Tsukamoto, Toyota; Yasuo Hojo, Nagoya; Seitoku Kubo, Toyota; Yutaka Taga; Hidehiro Oba, both of Aichi, all of Japan

[73] Assignees: Aisin AW Co., Ltd.; Toyota Jidosha Kabushiki Kaisha, both of Japan

[21] Appl. No.: 980,605

[22] Filed: Nov. 24, 1992

[30] Foreign Application Priority Data
Dec. 3, 1991 [JP] Japan .................. 3-344120

[51] Int. Cl.⁵ .............................................. F16H 3/44
[52] U.S. Cl. ..................... 475/119; 475/133; 475/120
[58] Field of Search ............... 475/119, 120, 123, 133

[56] References Cited

U.S. PATENT DOCUMENTS

| | | | |
|---|---|---|---|
| 3,433,098 | 3/1969 | Schaefer | 475/119 |
| 3,448,640 | 6/1969 | Nelson | 475/119 |
| 3,709,064 | 1/1973 | Schaefer et al. | 475/119 |
| 3,741,036 | 6/1973 | Brown | 475/119 |
| 3,789,698 | 2/1974 | Williams | 475/119 |
| 5,005,444 | 4/1991 | Kimura et al. | 74/863 |

Primary Examiner—Dirk Wright
Attorney, Agent, or Firm—Lorusso & Loud

[57] ABSTRACT

A control system is provided for servo hydraulic pressure in a vehicular automatic transmission having planetary gear mechanisms. Shifting elements of the mechanisms can be connected to establish a different power flow in accordance with engagement or release of frictional engagement devices under the control of servo hydraulic pressure to achieve plural speed stages. The system comprises a servo pressure feed line for feeding, even in a non-running range, servo hydraulic pressure to at least one particular device out of plural frictional engagement devices which are caused to simultaneously engage in a reverse range of the transmission, a directional control valve disposed in the line to control feed or drain of the servo hydraulic pressure to or from said particular device through the line, and a solenoid valve for controlling the control valve to prevent the feed of the servo hydraulic pressure at vehicle speeds above a predetermined value.

1 Claim, 4 Drawing Sheets

| | Solenoid | | | | | Clutch | | | Brake | | | | | One-way Clutch | | |
|---|---|---|---|---|---|---|---|---|---|---|---|---|---|---|---|---|
| | No.1 | No.2 | No.3 | No.4 | L-UP | C-0 | C-1 | C-2 | B-0 | B-1 | B-2 | B-3 | B-4 | F-0 | F-1 | F-2 |
| P | ○ | × | ○ | × | × | × | × | × | × | × | × | × | ○ | ○ | × | × |
| R V<V0 | ○ | × | × | ○ | × | × | × | ○ | ○ | × | × | × | ○ | × | × | × |
| R V≥V0 | ○ | ○ | × | ○ | × | × | × | ○ | ○ | × | × | × | × | × | × | × |
| N | ○ | × | ○ | × | × | × | × | × | × | × | × | × | ○ | ○ | × | × |
| 1ST | ○ | × | ○ | ⊗ | × | ○ | ○ | × | × | × | × | × | ⊗ | ○ | × | ○ |

| Remarks | |
|---|---|
| ○ | ON / Engaged / Locked |
| × | OFF / Released / Free |
| ⊗ | SOL.ON: engine brake not applied / SOL.ON: engine brake applied / Engaged when engine brake is applied / — |

FIG. 3

CONTROL SYSTEM FOR SERVO HYDRAULIC PRESSURE IN VEHICULAR AUTOMATIC TRANSMISSION

BACKGROUND OF THE INVENTION

1) Field of the Invention

This invention relates to a control system for servo hydraulic pressure in a vehicular automatic transmission, especially to a control system for servo hydraulic pressure adapted to have frictional engagement means engaged or released for changing the gear position of an automatic transmission.

2) Description of the Related Art

An automatic transmission mounted on a vehicle is generally provided with plural planetary gear mechanisms. Upon shifting the speed, shifting elements (gears, carriers, ring gears) of these planetary gear mechanisms are connected in accordance with engagement or release of frictional engagement means to establish a different power flow. The transmission is designed to achieve plural speed stages in this manner. Depending on the arrangement of the planetary gear mechanisms, such a transmission may require simultaneous engagement of frictional elements of plural frictional engagement means upon shifting from a non-running range, in which all the frictional engagement means are released, to a reverse range for driving backward. If it is desired to have such operations done at once upon shifting, a great deal of hydraulic oil must be fed to each frictional engagement means so that the supply of servo pressure may exceed the delivery capacity of a pump as a hydraulic pressure source. This results in prolongation in the time required to raise the servo pressure until the frictional elements are caused to engage, leading to the problem that an unduly large time lag occurs until the planetary gear mechanisms are connected to achieve the reverse range.

For the elimination of such a time lag without increasing the capacity of the hydraulic pressure source, it may be considered effective to have certain frictional engagement means engaged beforehand, said frictional engagement means being some of those engaged in the reverse range and causing no problem even when maintained in an engaged state in the non-running range. An investigation through the prior art from such a viewpoint has revealed that automatic transmissions capable of achieving four speeds by the combination of an underdrive mechanism with planetary gear mechanisms for three forward speeds include those capable of achieving the reverse range by causing a brake of an underdrive mechanism to engage. Such transmissions make use of the construction that the above brake, whose actuation is not particularly required for the actuation of a one-way clutch in a forward drive, is kept engaged even in the non-running range and at the first speed. Apart from the question of whether such a construction was intended to overcome the avove problem, use of such a construction would appear to be effective for its elimination.

According to the above conventional technique, however, shifting to the non-running range during high-speed running of a vehicle causes excessive rotation of the planetary gear mechanisms due to the engagement of the brake. The conventional technique therefore involves the potential problem that the durability of the planetary gear mechanisms may be reduced.

SUMMARY OF THE INVENTION

With the foregoing in view, the present invention has as a primary object the provision of a control system for servo hydraulic pressure in a vehicular automatic transmission, which system can, by controlling feed or drain of servo pressure to or from frictional engagement means of the automatic transmission, eliminate the time lag upon shifting to the reverse range without the need for the provision of any means for increasing the capacity of a hydraulic pressure source and, moreover, without causing excessive rotation of the gear train even when a careless and inappropriate shifting operation is performed.

To overcome the above problem, the present invention therefore provides a control system for servo hydraulic pressure in a vehicular automatic transmission provided with planetary gear mechanisms disposed between an input shaft and an output shaft so that shifting elements of the planetary gear mechanisms can be connected under control by servo hydraulic pressure to establish a different power flow in accordance with engagement or release of frictional engagement means and hence to achieve plural speed stages, comprising:

a servo pressure feed line for feeding, even in a non-running range, servo hydraulic pressure to at least one particular frictional engagement means out of plural frictional engagement means which are caused to simultaneously engage in a reverse range of the automatic transmission;

a directional control valve disposed in the servo hydraulic pressure feed line to control feed or drain of the servo hydraulic pressure to or from said particular frictional engagement means through the line; and a solenoid valve for controlling the directional control valve to prevent the feed of the servo hydraulic pressure at vehicle speeds above a predetermined value.

In the servo hydraulic pressure control system of the present invention constructed as described above, servo pressure has been applied in advance to frictional engagement means which take a part in the achievement of the reverse range. It is therefore possible to decrease the number of frictional engagement means which require fresh supplies of servo pressure upon actually shifting to the reverse range, thereby making it possible to eliminate, without the need for an increase in the capacity of the hydraulic pressure source, the shifting time lag which would otherwise occur due to a delay in the actuation of the frictional engagement means. Moreover, the application of servo pressure to the frictional engagement means can be prevented by a change-over of the directional control valve, which change-over of the directional control of the solenoid valve in accordance with the running speed of the vehicle. It is therefore possible to avoid excessive rotation of the planetary gear mechanisms which would otherwise take place due to careless and inappropriate shifting to the non-running range during high-speed running of the vehicle.

BRIEF DESCRIPTION OF THE DRAWINGS

The above and other objects, features and advantages of the present invention will become apparent from the following description and the appended claims, taken in conjunction with the accompanying drawings, in which:

FIG. 3 is a gear engagement diagram of the automatic transmission;

DETAILED DESCRIPTION OF THE INVENTION AND PREFERRED EMBODIMENT

Figure 1:
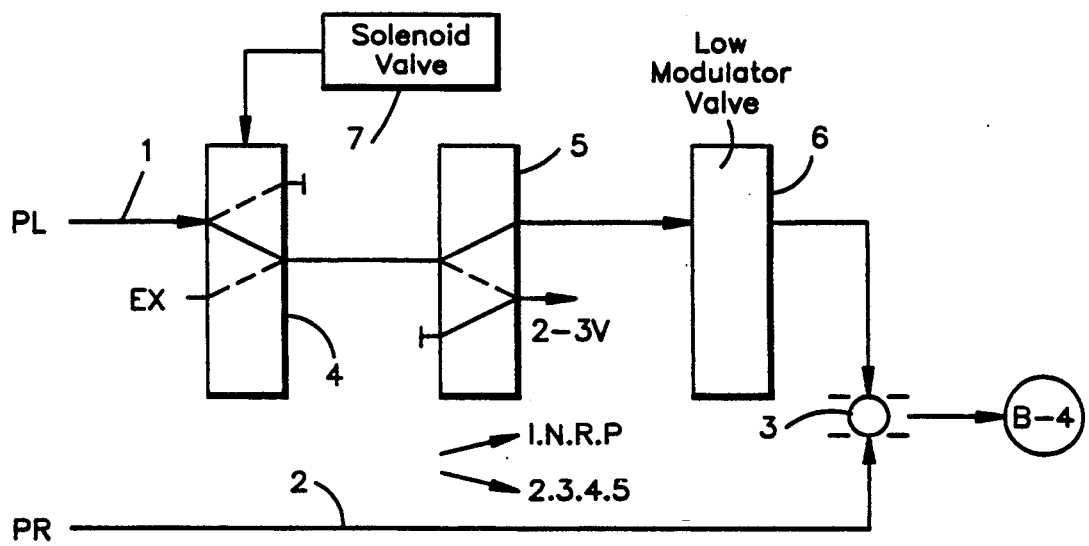
FIG. 1 is a schematic circuit diagram of a servo hydraulic pressure control system according to one embodiment of the present invention.

The servo hydraulic pressure control system according to the one embodiment of the present invention will hereinafter be described with reference to the accompanying drawings. The automatic transmission to which the servo hydraulic pressure control system of this invention is applied is a five-speed automatic transmission. As is understood from FIG. 2 which illustrates its gear train in skeleton, a 4-forward/1-reverse primary shifting unit M composed of an in-line train of three planetary gears is combined with an inlet-side overdrive planetary gear OD. Frictional engagement means which are simultaneously caused to engage upon change-over to a reverse range from a non-running range are brakes B-0,B-4 and a clutch C-2.

Describing the outline construction first, the automatic transmission in the illustrated embodiment is provided, as in the conventional art, with the input-side overdrive planetary gear OD and the primary shifting unit M in addition to a torque converter T equipped with a lockup clutch. The inlet-side overdrive planetary gear OD has a clutch C-0 for connecting or disconnecting a carrier C0 and a sun gear S0 as well as the brake B-0 for holding a one-way clutch F-0 and the sun gear S0. The primary shifting unit M is provided with the three sets of planetary gears P1,P2,P3 connected together in series, in which individual shifting elements (sun gears, carriers, ring gears) making up the planetary gears are directly connected as needed. In association with the individual gears, i.e., the shifting elements, clutches C-1,C-2, brakes B-1 to B-4 and one-way clutches F-1,F-2 are arranged. Although not shown in the drawing, the individual clutches and brakes as the frictional engagement means are each provided, as in the conventional art, with servo means which has a piston to have a friction element of the corresponding frictional engagement means engaged or released under control by servo control pressure.

In the automatic transmission, as depicted by its gear engagement diagram shown in FIG. 3, the clutches C-1,C-2 which take a part in the transmission of drive power are released in non-running ranges, i.e., the parking range (P) and the neutral (N) range, whereby no transmission of drive power takes place in the primary shifting unit M. To shift the automatic transmission from the above gear position to the reverse (R) range, the clutch C-2 and the brake B-4 are engaged and, in order to prevent the reverse gear (R) ratio from becoming unduly large in view of the characteristics of the gear train when the above connection alone is relied upon, the brake B-0 is also engaged so that input rotation entering the primary shifting unit M is accelerated. Accordingly, this gear train requires to make the three frictional engagement means engage upon shifting to the reverse (R) range. The brake B-4 is thus kept engaged even in the non-running ranges.

In the hydraulic pressure control system of the automatic transmission, as shown by its circuit construction schematically illustrated in FIG. 1, a servo pressure feed line adapted to feed servo pressure to the brake B-4 to keep it engaged beforehand in a non-running range is composed of a main pressure feed line 1 which can always feed hydraulic pressure in the neutral range and also in the parking range irrespective of the shift position. Further, the hydraulic pressure control system is also constructed to receive a supply of hydraulic pressure from a reverse range pressure feed line 2 which permits the feeding of hydraulic pressure upon shifting to the reverse range.

Namely, both these lines are connected to the servo means for the brake B-4 via a shuttle valve 3. The reverse range pressure feed line 2 is connected directly to the shuttle valve 3. At the forward first position in each range, the main pressure feed line 1 is connected to the shuttle valve 3 via a directional valve arranged in the hydraulic pressure control circuit to effectively apply an engine brake, namely, an engine brake control valve 4, a 1-2 shift valve 5 changeable upon shifting from the first speed to the second or higher speed, and a low modulator valve 6 for regulating servo pressure to the servo means for the brake B-4 while using the back pressure of an accumulator as a signal pressure. The engine brake control valve 4 is equipped with a solenoid valve 7 which is controlled and changed over by a signal from an electronic control unit.

Figure 5:
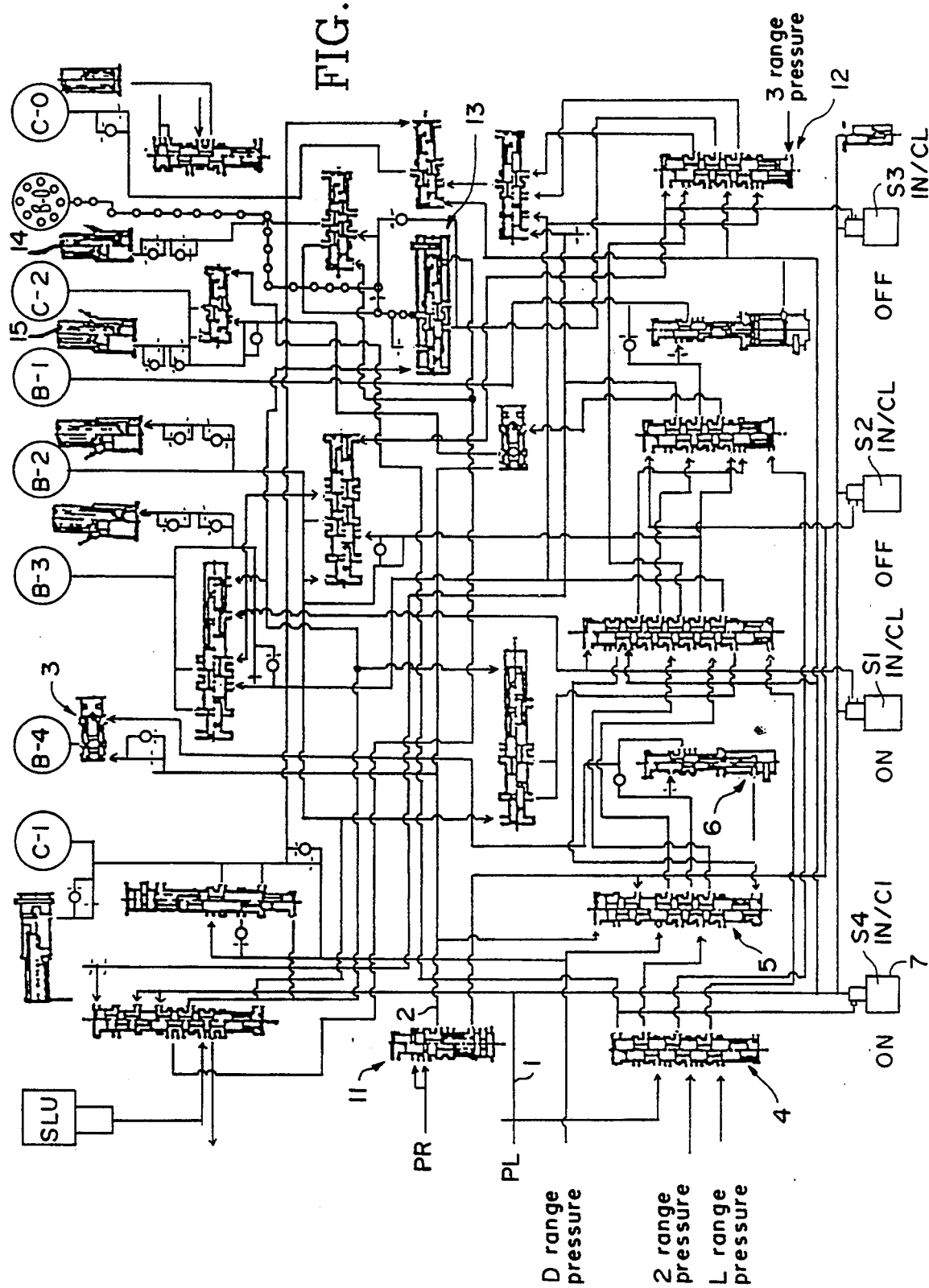
FIG. 5 is a fragmentary diagram of a hydraulic circuit of the automatic transmission.

As to the specific construction of each element, a circuit portion downstream of a manual valve is shown in detail in FIG. 5 for the sake of reference, in which elements of structure corresponding to those shown in FIG. 1 are designated by like reference numerals and their specific description is omitted herein.

Figure 4:
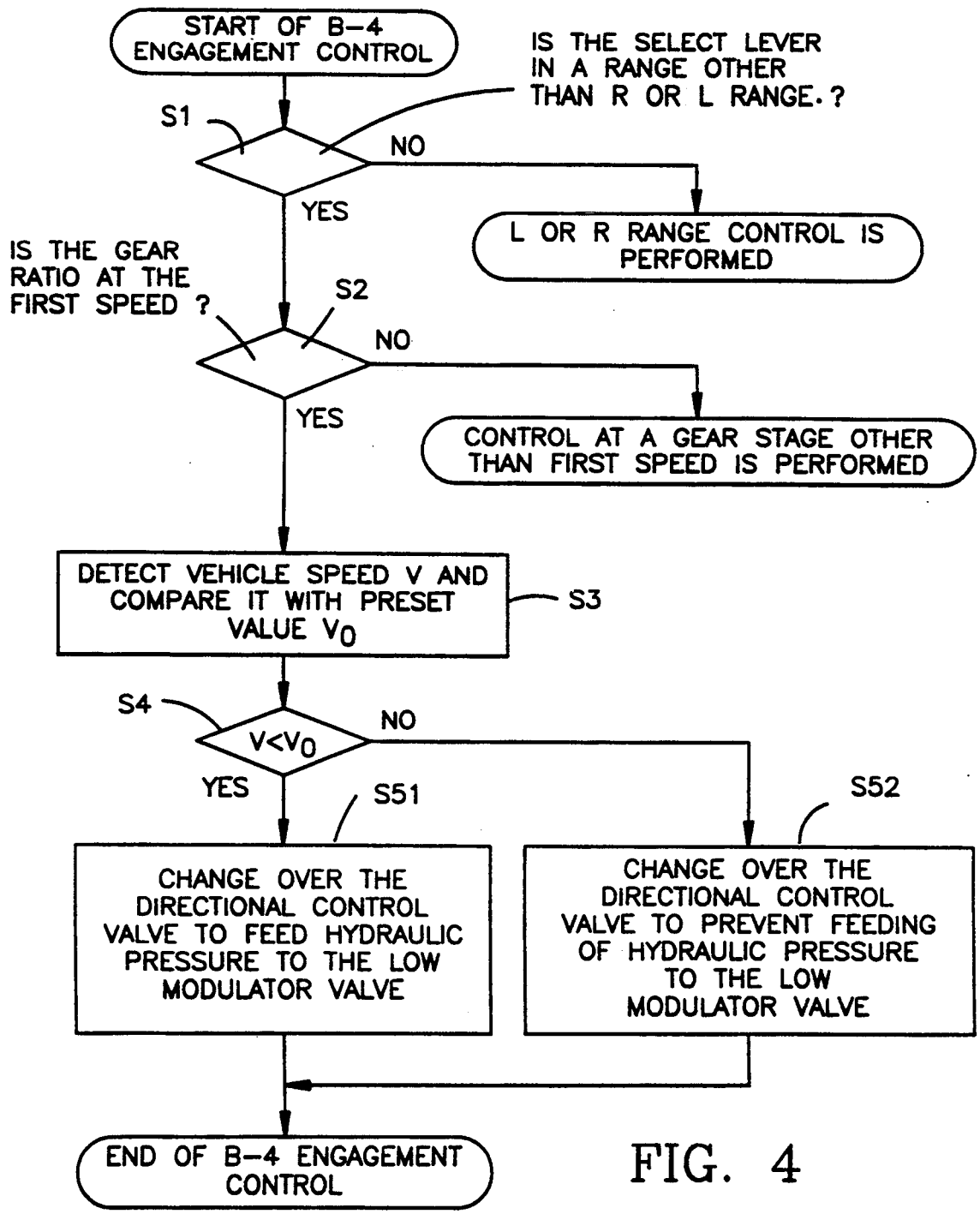
FIG. 4 is a flow chart of a control flow for the servo hydraulic pressure control system.

Operation of the servo hydraulic pressure control system constructed as described above will now be described in accordance with the control flow shown as a chart in FIG. 4 while additionally referring to other drawings. Started first is control of B-4 engagement which in turn controls engagement of the brake B-4. In the first step S1, the position of a select lever employed to change the range is determined. Where its position is in either the low (L) or the reverse (R) range, the operation is excluded from the control routine. In the next step S2, it is determined whether the gear ratio of the transmission is at the first speed or not. If it is at any speed other than the first speed, the operation is excluded from the control routine. In step S3, the current vehicle speed V and a preset vehicle speed $V_0$ are compared based on the result of detection by a vehicle speed sensor.

When the current speed is judged to be lower than the preset vehicle speed $V_0$, the routine advances to the next step S51. The control signal for the solenoid valve 7 is turned off and the engine brake control valve 4 is changed over, whereby line pressure PL is fed to the low modulator valve 6 through the 1-2 shift valve 5 which communicates an output port of the engine brake control valve 4 with an input port of the low modulator valve 6 at the first speed. The line pressure PL is regulated by the low modulator valve 6 and is fed to the servo means for the brake B-4 by way of the shuttle valve 3.

If the current vehicle speed V is judged to be higher than the preset vehicle speed $V_0$, step S52 is selected. Here, the control signal for the solenoid valve 7 is turned on, and the engine brake control valve 4 is changed over so that its output port to the 1-2 shift valve 5 is closed. As a result, the feed of hydraulic pressure from the main pressure feed line 1 to the brake B-4 is prevented. This control is to prevent the gear train of the transmission from excessively rotating as a result of engagement of the brake B-4 when the select lever is changed over to the neutral range at a high engine revolution speed while running at the first speed. By the above steps, the control of the brake B-4 has ended.

When the select lever is changed over to the reverse (R) range from a non-running range, the feed of hydraulic pressure to the brake B-4 is effected from the reverse range pressure feed line 2 through a reverse control valve 11 as shown by solid lines in FIG. 5 in which the hydraulic circuit is illustrated in detail. Servo pressure is also fed from this line to the clutch C-2. On the other hand, the feed of servo pressure to the brake B-0 is effected from the main pressure feed line 1. The line pressure PL is fed to the B-0 control valve 13 via a 4-5 shift valve 12 and, after being regulated there, is fed to the brake B-0 through the lines marked by dots in the drawing.

Figure 2:
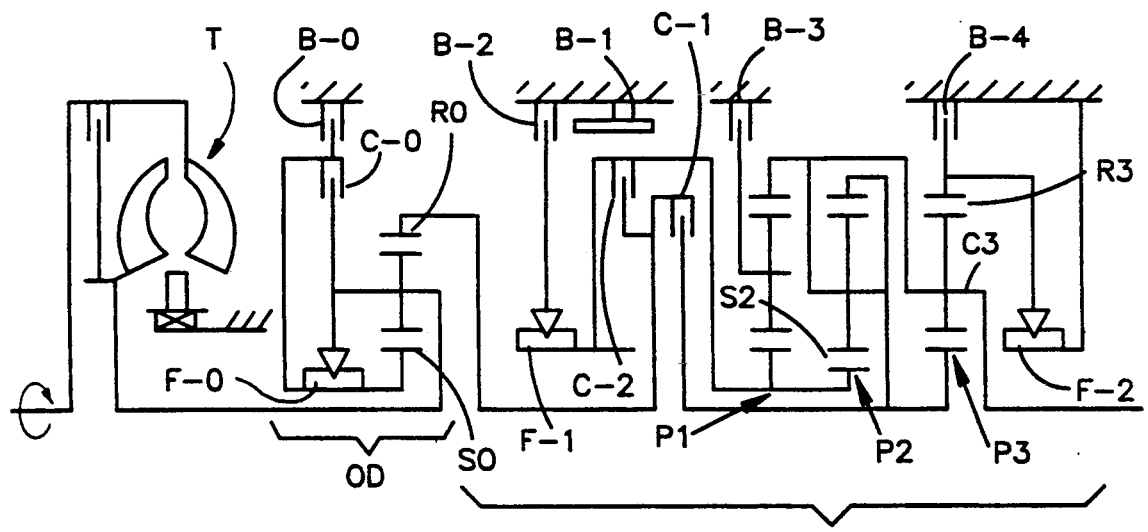
FIG. 2 is a skeleton diagram of an illustrative gear train of an automatic transmission controlled by the above system.

When the three frictional engagement means are caused to engage in the gear train shown in FIG. 2, an input enters via the carrier C0 of the input-side overdrive planetary gear OD and, as reaction force produced due to holding of the sun gear S0, is outputted from the ring gear R0. This overdrive rotation enters from the clutch C-2 of the primary shifting unit M to the sun gear S2 of the planetary gear P2. As a result of holding of the ring gear R3 of the planetary gear P3, reverse rotation decelerated by the combination of the planetary gears P2 and P3 is outputted from the carrier C3.

In the servo hydraulic pressure control system according to the above-described embodiment, servo pressure has been applied beforehand from the main pressure feed line 1 to the brake B-4 which takes a part in the establishment of the reverse stage in a non-running range. Accordingly, those requiring a fresh supply of hydraulic oil upon actual change-over to the reverse range are the brake B-0, the clutch C-2 and the accumulators 14,15 which are associated with the brake B-0 and the clutch C-2, respectively. It is therefore possible to reduce the amount of hydraulic oil to be fed additionally from the hydraulic pressure source. This makes it possible to eliminate the time lag upon shifting operation, which time lag would otherwise take place due to a delay in the operation of the frictional engagement means, without the need for increasing the capacity of the hydraulic pressure source. Moreover, the application of servo pressure to the brake B-0 is prevented at speeds above the preset vehicle speed $V_0$ owing to change-over of the engine brake control valve 4 which is controlled by the solenoid valve in accordance with the running speed of the vehicle. It is hence possible to avoid excessive rotation of the planetary gear mechanisms, which excessive rotation would otherwise occur through careless and inappropriate shifting during high-speed running of the vehicle.

The present invention has been described in detail based on one embodiment in which the present invention was applied to a five-speed automatic transmission. It is to be noted that apparatuses to which the present invention can be applied are not limited to such automatic transmissions. In the embodiment described above, the engine brake control valve which causes an engine brake to be applied upon achievement of the first speed was used as a directional control valve. Other valves can also be employed depending on the construction of the hydraulic circuit. The specific construction of each element of structure can be changed or modified as desired within the scope of the claim.

We claim:

1. A control system for servo hydraulic pressure in a vehicular automatic transmission provided with planetary gear mechanisms disposed between an input shaft and an output shaft so that shifting elements of the planetary gear mechanisms can be connected under control by servo hydraulic pressure to establish a different power flow in accordance with engagement or release of frictional engagement means and hence to achieve plural speed stages, comprising:

a servo pressure feed line for feeding, even in a non-running range, servo hydraulic pressure to at least one particular frictional engagement means out of plural frictional engagement means which are caused to simultaneously engage in a reverse range of the automatic transmission;

a directional control valve disposed in the servo hydraulic pressure feed line to control feed or drain of the servo hydraulic pressure to or from said particular frictional engagement means through the line; and a solenoid valve for controlling the directional control valve to prevent the feed of the servo hydraulic pressure at vehicle speeds above a predetermined value.

* * * * *

UNITED STATES PATENT AND TRADEMARK OFFICE
CERTIFICATE OF CORRECTION

PATENT NO. : 5,334,114
DATED : August 2, 1995
INVENTOR(S) : ANDO et al

It is certified that error appears in the above-indentified patent and that said Letters Patent is hereby corrected as shown below:

Col. 1, line 59, delete "avove" insert --above--.

Col. 2, line 53, delete "the directional" and insert --takes place under the--.

Signed and Sealed this

Twenty-fifth Day of July, 1995

Attest:

BRUCE LEHMAN

Attesting Officer     Commissioner of Patents and Trademarks